US006759602B2

United States Patent
Miller et al.

(10) Patent No.: US 6,759,602 B2
(45) Date of Patent: Jul. 6, 2004

(54) APPARATUS AND METHOD FOR WEIGHING MAILPIECES IN MOTION

(75) Inventors: John P. Miller, Shelton, CT (US); Sanju Ballurkar, Naugatuck, CT (US); Anthony E. Yap, Danbury, CT (US); Steven H. Joyce, Wallingford, CT (US)

(73) Assignee: Pitney Bowes Inc., Stamford, CT (US)

( * ) Notice: Subject to any disclaimer, the term of this patent is extended or adjusted under 35 U.S.C. 154(b) by 225 days.

(21) Appl. No.: 09/850,967

(22) Filed: May 8, 2001

(65) Prior Publication Data

US 2002/0166704 A1 Nov. 14, 2002

(51) Int. Cl.[7] .......................................... G01G 19/414
(52) U.S. Cl. .................... 177/25.15; 705/407; 705/414; 177/1
(58) Field of Search ................ 177/1, 25.11–25.15, 177/145, 253, 262; 705/407, 414

(56) References Cited

U.S. PATENT DOCUMENTS

| | | | |
|---|---|---|---|
| 4,063,604 A | | 12/1977 | Rock ............................ 177/25 |
| 4,488,610 A | | 12/1984 | Yankloski ....................... 177/4 |
| 4,742,878 A | * | 5/1988 | Freeman et al. ......... 177/25.15 |
| 4,868,757 A | | 9/1989 | Gil ........................ 364/464.03 |
| 5,086,855 A | * | 2/1992 | Tolson ........................ 177/145 |
| 5,137,099 A | * | 8/1992 | Tolson ........................ 177/145 |
| 5,326,938 A | * | 7/1994 | Tolson ........................ 177/145 |
| RE34,839 E | * | 1/1995 | Tolson ........................ 177/145 |
| 5,379,992 A | | 1/1995 | Holmes et al. ................ 271/2 |
| 5,670,752 A | * | 9/1997 | Nakajima ................... 177/145 |
| 5,684,275 A | * | 11/1997 | Tolson ........................ 177/145 |
| 5,814,772 A | | 9/1998 | Nishimura et al. ......... 177/145 |
| 6,107,579 A | * | 8/2000 | Kinnemann ................. 177/145 |
| 6,265,675 B1 | | 7/2001 | Hübler et al. ............ 177/25.15 |
| 6,559,391 B2 | * | 5/2003 | Huebler et al. .......... 177/25.15 |

FOREIGN PATENT DOCUMENTS

EP        0 974 819 A2    1/2000   ......... G01G/19/00

* cited by examiner

*Primary Examiner*—Randy W. Gibson
(74) *Attorney, Agent, or Firm*—Christopher J. Capelli; Angelo N. Chaclas (57) ABSTRACT

A method for weighing mailpieces while in motion in a mailpiece weighing system. The weigh pan in the mailpiece horizontal transport path generates a signal corresponding to a weight of the moving mailpiece, and the system controller compares the weight of the moving mailpiece to a postal weight break to determine if the postal weight break is within the margin of error of the weighing mechanism. If the postal weight break is within the margin of error of the weighing mechanism, the system controller stops transport of the moving mailpiece and reweighs the mailpiece.

4 Claims, 10 Drawing Sheets

APPARATUS AND METHOD FOR WEIGHING MAILPIECES IN MOTION

FIELD OF THE INVENTION

The invention disclosed herein relates generally to automated mail sorting and more particularly, an apparatus and method for weighing mail in motion, or on the fly, while maintaining the mail in a vertical orientation.

BACKGROUND

The processing and handling of mailpieces consumes an enormous amount of human and financial resources, particularly if done manually. In addition to the postal service, the processing and handling of mailpieces occurs at each and every business or site where communication via the mail delivery system is utilized. Various pieces of mail generated by multiple departments and individuals within a company need to be collected, sorted, addressed and franked as part of the outgoing mail process. Additionally, incoming mail needs to be collected and sorted efficiently to ensure that it gets to the addressee in a minimal amount of time. Since much of the mail being conveyed through the mail system is critical in nature, it is imperative that the processing and handling of both the incoming and outgoing mailpieces be efficient and reliable so as not to impact negatively the operation of the business.

In view of the above, various automated mail handling machines have been developed for processing mail (removing individual pieces of mail from a stack and performing subsequent actions on each individual piece of mail). However, in order for these automatic mailing machines to be effective, they must process and handle "mixed mail". The term "mixed mail" is used herein to mean sets of intermixed mailpieces of varying size (postcards to 9" by 12" flats), thickness, and weight. In addition, the term "mixed mail" also includes stepped mail (i.e., an envelope containing an insert which is smaller than the envelope to create a step in the envelope), tabbed and untabbed mail products, and mailpieces made from different substrates. Thus, the range of types and sizes of mailpieces which must be processed is extremely broad and often requires trade-offs to be made in the design of mixed mail feeding devices in order to permit effective and reliable processing of a wide variety of mixed mailpieces.

In known mixed mail handling machines which separate and transport individual pieces of mail away from a stack of mixed mail, the stack of mixed mail is first loaded onto some type of transport system for subsequent sorting into individual pieces of mail. Typically, it is preferable to transport a mailpiece in a vertical orientation (on its bottom edge) in order to facilitate the manipulation of individual mailpieces. In systems handling outgoing mail, it is necessary to affix the individual mailpieces with the proper postage. To calculate proper postage it is necessary for the system to determine the distance and manner in which a mailpiece is being sent in addition to its size and weight.

Various scanning and sorting technologies have been implemented as part of automated mail handling systems to determine the distance and manner in which a mailpiece is being sent along with its size. However, prior art systems of mail handling do not adequately provide for the accurate calculation of the weight of a particular mailpiece as it is being processed. To weigh a mailpiece as quickly and accurately as possible, it is desirable to minimize the amount of vibration while weighing the mailpiece. The method used in numerous contemporary systems is to stop the transport of the mailpiece during weighing. While this reduces the vibration caused by the transport, it also increases the cycle time of the mailpiece due to the time required to decelerate the mailpiece, wait for the transport to settle, measure the weight of the mailpiece and accelerate the mailpiece out of the system. Still other contemporary mail handling systems require that the weighing process be performed on a horizontally oriented mailpiece.

Although weighing mailpieces while in transport reduces the need for stopping the system, certain situations require the mail process to be halted. For example, if the weight of the mailpiece is very close to the postal weight break, the accuracy needed to prevent an inaccurate weight classification may require more time and scale stability than can be provided a moving transport. In such a case, there are three choices: 1) apply postage that may be incorrect, 2) acknowledge the incorrectly weighed mailpiece and divert it away from the stack of mail, or 3) stop the transport and wait for the scale to stabilize and then reweigh the mailpiece. The present invention provides for the third scenario, i.e., stop-on-demand weighing. For example, first class letter rates increase by the ounce. Thus, the postal weight breaks are at one ounce, two ounces, three ounces and so forth. When the system weighs a mailpiece, if the postal weight break is within the weight of the mailpiece plus or minus the weighing system's margin of error, the mailpiece is reweighed. This feature allows the system to automatically stop when more precise measurements are needed.

One of the problems of the prior art is that an apparatus is not available for the accurate calculation of the weight of a mailpiece while the mailpiece is in a vertical orientation, that is, on a mailpiece's bottom edge. Another problem of the prior art is that mechanical vibrations introduced by the system generate inaccurate weight measurements. Yet another problem of the prior art is that the weighing process requires the re-orientation of the mailpiece to be weighed or a stoppage in the mail handling process in order to generate an accurate weight measurement. Therefore, a method is needed to provide for the efficient measurement of the weight of a mailpiece while maintaining the vertical orientation of the mailpiece.

SUMMARY OF THE INVENTION

Utilized as part of a complete system of automated mail handling, the present invention overcomes the disadvantages of the prior art by providing an apparatus and method for accurately measuring the weight of vertically oriented mailpieces without stopping the mail handling process. In a currently preferred embodiment of the invention, a bottom belt transport oriented parallel to the base and with vertical baffles is mounted on a weighing mechanism (load cell) which in turn is mounted on the base of the apparatus. In this configuration, mailpieces enter the transport in a vertical orientation and are biased against the bottom of the belt by gravity. This eliminates the need for ski rollers, which create vibrations, as they engage and disengage the mailpieces. Only two rotating elements are required in this transport, which also reduces vibration. By minimizing vibration, a measurement of the weight of the mailpieces can be determined more accurately and quickly, thereby increasing overall throughput of the apparatus.

In another currently preferred embodiment, a bottom belt transport, also oriented parallel to the base, is mounted on a pair of load cells which, in turn, are independently mounted to the base of the apparatus. Again, mailpieces enter the transport in a vertical orientation and are biased against the bottom of the belt by gravity. A first load cell is located at the input end of the apparatus, and a second load cell is located at the output end of the apparatus. The signals received from the first and second load cells are combined via a trim balance circuit which, in turn, transmits the weight to the main processing system of the mail handling system in which the inventive apparatus is installed.

In yet another preferred embodiment, the vertical baffles are held in place by baffle support brackets which, in turn, are mounted directly to the base of the apparatus. Isolating the baffles from the transport and load cells reduces vibration at the load cells by limiting the vibration caused by mailpieces impacting the baffles. By minimizing vibration, a measurement of the weight of the mailpieces can be determined more accurately and quickly, thereby increasing overall throughput of the apparatus. Vertical baffles held in place by baffle support brackets may be utilized in apparatus using either one or a plurality of load cells to measure the weight of the mailpiece in the transport.

In yet another preferred embodiment, the transport belts are oriented perpendicular to the base. The entire system is mounted on top of a structural pillar connected to the base, thus making the entire system suspended in air. A single load cell has its weighing surface oriented parallel to the transport belts, or perpendicular to the base. Any vibrations or oscillations in the mechanics of the system would be minimized because they would not occur in the same vector as the weight of the mailpiece.

Thus, an advantage of the present invention is that it may accurately weigh mailpieces in a vertical orientation, or on their bottom edge. Another advantage is that the present invention reduces the overall vibration present in the system, thereby providing a more accurate calculation of weight. Yet another advantage of the present invention is that it does not require the transport to be stopped in order to calculate the weight of a mailpiece.

Additional objects and advantages of the invention will be set forth in the description which follows, and in part will be obvious from the description, or may be learned by practice of the invention. The aforementioned advantages are illustrative of the advantages of the various embodiments of the present invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Horizontal Mailpiece Weighing Transport with Dual Load Cells

Referring to FIGS. 1, 2, 3 and 4, a mailpiece weighing transport 102 is shown. Mailpiece weighing transport 102, as will be discussed in more detail below, weighs and transports an individual mailpiece 104 along transport belt 106 from the input end of mailpiece weighing transport 102, generally designated by arrow 108a to the output end of mailpiece weighing transport 102, generally designated by arrow 108b. The course that the mailpiece 104 travels from the input end 108a to 108b is the transport path.

Mailpiece weighing transport 102 includes a base 110 upon which all of the components of mailpiece weighing transport 102 are mounted. In one preferred embodiment, a pair of load cells 112a and 112b are used to measure the weight of mailpiece 104 as it travels through mailpiece weighing transport 102. Load cell 112b is mounted on base 110 at input end 108b and load cell 112a is mounted on base 110 at output end 108a. Load cell support brackets 114a and 114b connect load cells 112a and 112b to support plate 120. Any type of forward driving mechanism can be used to transport mailpiece 104. Preferably, the forward driving mechanism comprises a transport belt 106. Transport belt 106 is attached to support plate 120 by drive pulley 116 and idler pulley 118 and is supported by slider plate 122 which is also attached to support plate 120. Locomotion to the system is provided by motor 130 which is mounted on mailpiece weighing transport 102 and directly connected to drive pulley 116. Along the transport path are guides that ensure the mailpiece 104 stays on the transport path. Support baffles 124a and 124b, examples of guides, are mounted parallel to each other on opposing sides of transport belt 106. Support baffle 124a is held in place by support baffle brackets 126a, 126b and 126c which are mounted on base 110. Support baffle 124b is held in place by support baffle brackets 126d, 126e and 126f which are mounted on base 110.

In general, the present invention determines the weight of a mailpiece 104 by measuring the load generated (the signal output by the load cells 112a and 112b combined) by a mailpiece 104 combined with the weighing platform (the components of mailpiece weighing transport 102 which are mounted on top of the load cells 112a and 112b), then subtracting the known load generated by the weighing platform (the tare). The remaining load is assumed to be generated by mailpiece 104 and any transient vibrations caused by the system and/or movement of mailpiece 104. The measurement of the load minus the tare is then filtered to account for any transient vibrations, and the resulting measurement is then converted to a weight measurement and transmitted to mail processing system controller 100 (such as the WOW board utilized in Pitney Bowes Paragon® and Galaxy® automated mail processing systems). In a multiple load cell configuration, the measurements from each of the load cells 112a and 112b are combined using a trim balance circuit 128 before the measurement is transmitted for further processing to determine the weight of mailpiece 104.

In operation, a mailpiece 104 enters the mailpiece weighing transport 102 in a vertical orientation at input end 108a and travels along on transport belt 106 towards output end 108b. Mailpiece 104 is biased against transport belt 106 by a normal force, gravity, and is maintained in a vertical orientation by support baffles 124a and 124b that prop up the side surface of the mailpiece 104. Support baffles 124a and 124b prevent mailpiece 104 from toppling over as it is moved through mailpiece weighing transport 102. The weighing platform of mailpiece weighing transport 102 consists of transport belt 106 (an endless flat belt) supported between drive pulley 116 and idler pulley 118 with slider plate 122 which are mounted together to support plate 120. Forward motion is provided to transport belt 106 by motor 130 which is mounted on support plate 120 and directly connected to drive pulley 116.

As mailpiece 104 moves along transport belt 106, it causes load cells 112a and 112b to generate electrical analog output signals proportional to the force being applied to the top surface of the load cells 112a and 112b in response to the force of gravity acting upon the weighing platform and the mailpiece 104. The electrical signals from 112a and 112b can be combined into a single signal via any appropriate signal converter known in the art. For example, the electrical signal can be combined via a trim balance circuit 128 and then transmitted to mail processing controller 100.

Figure 1:
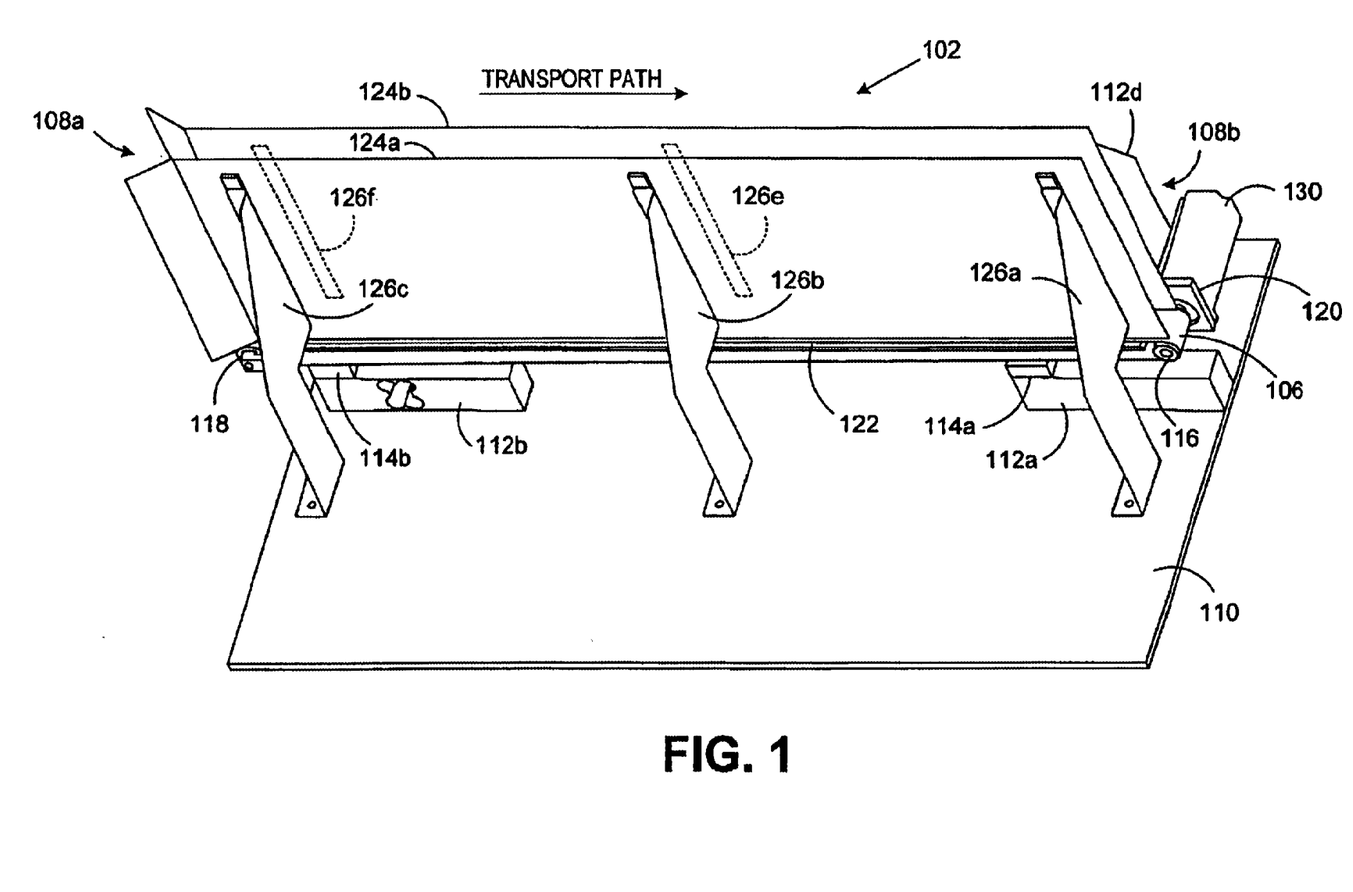
FIG. 1 is an isometric view of a dual load cell embodiment of the mail handling apparatus with a horizontal mail weighing transport of the present invention.
Figure 2:
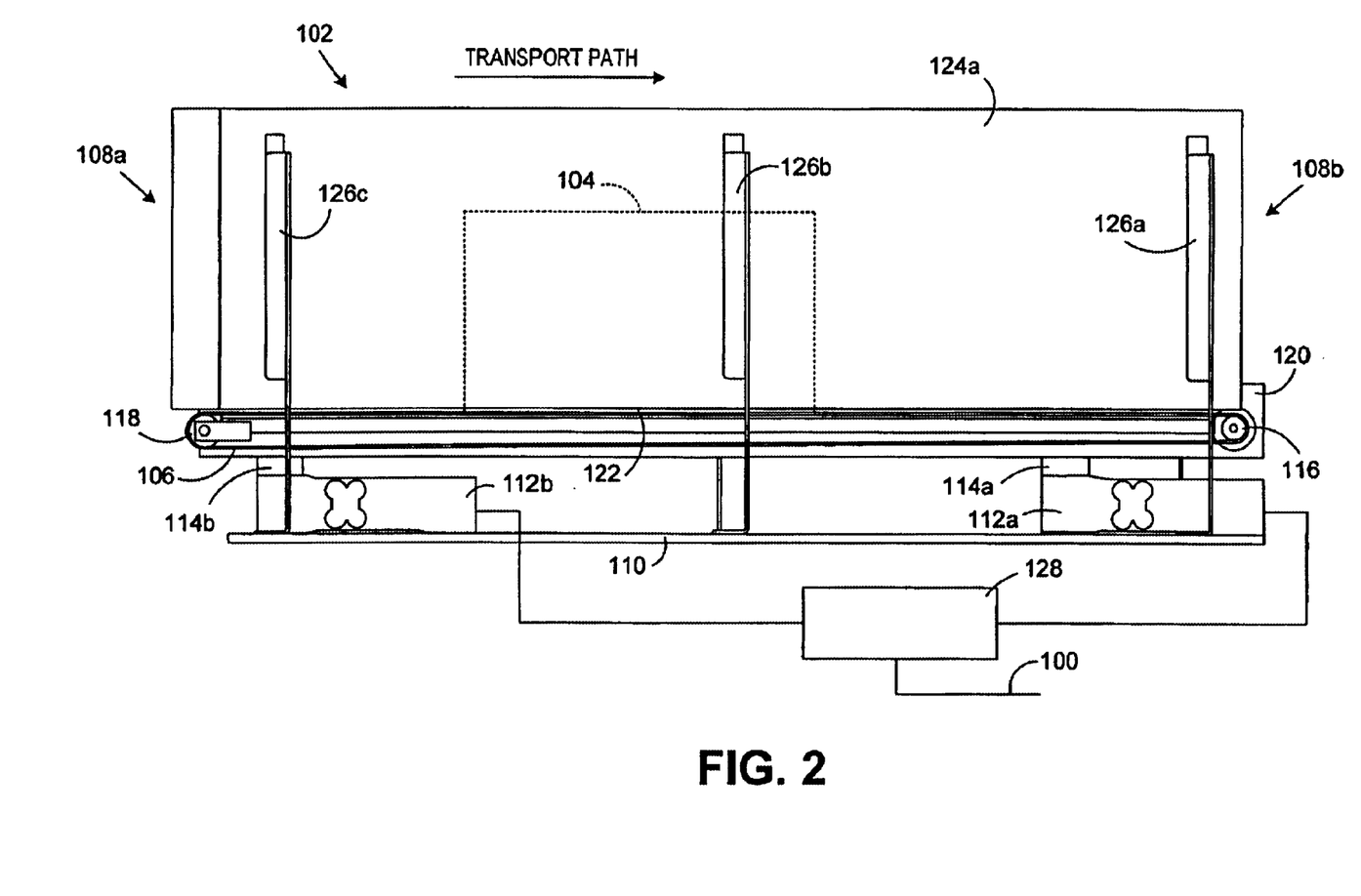
FIG. 2 is a side view of the mail handling apparatus illustrated in FIG. 1.
Figure 3:
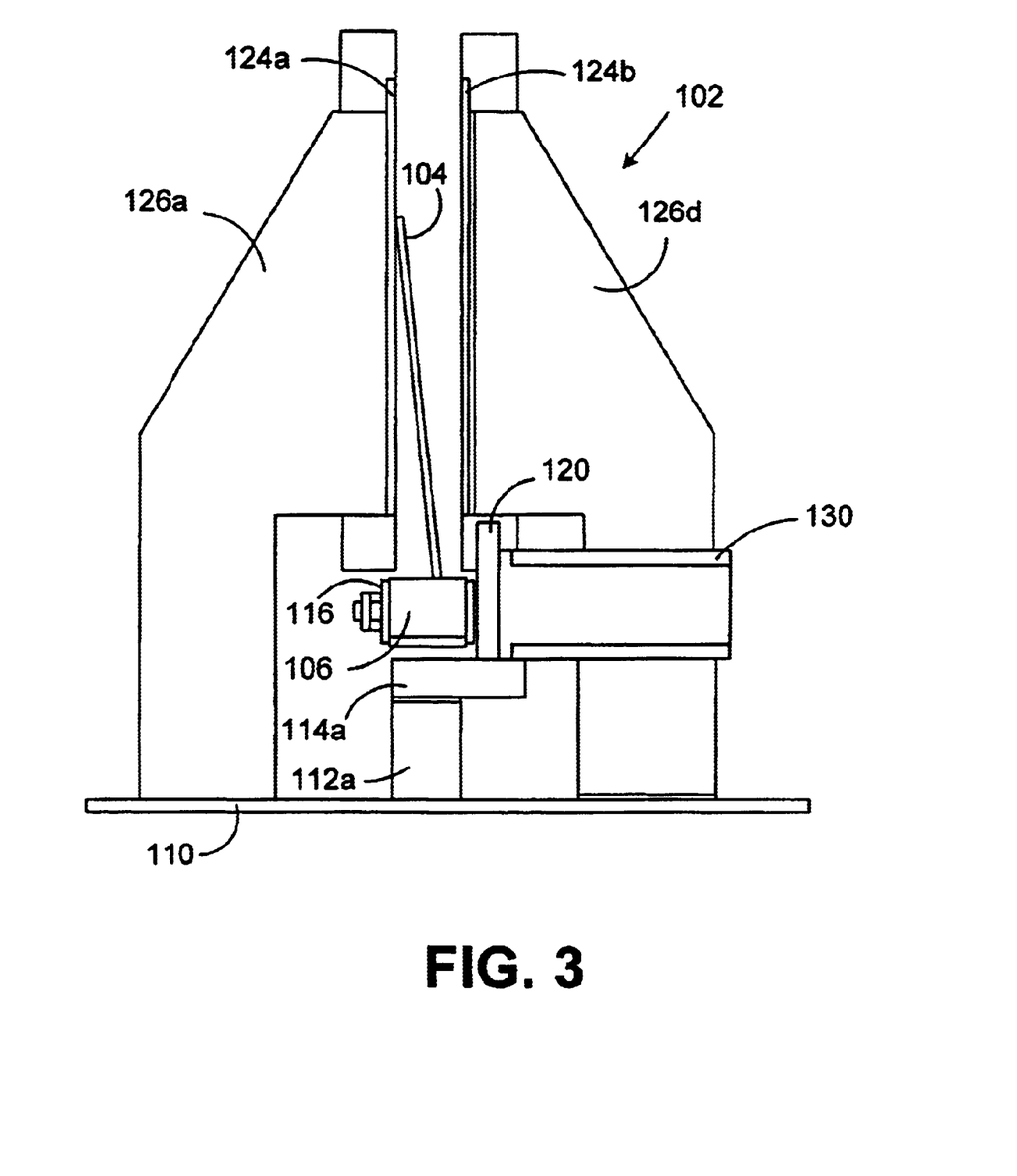
FIG. 3 is an end view of the mail handling apparatus illustrated in FIG. 1.
Figure 4:
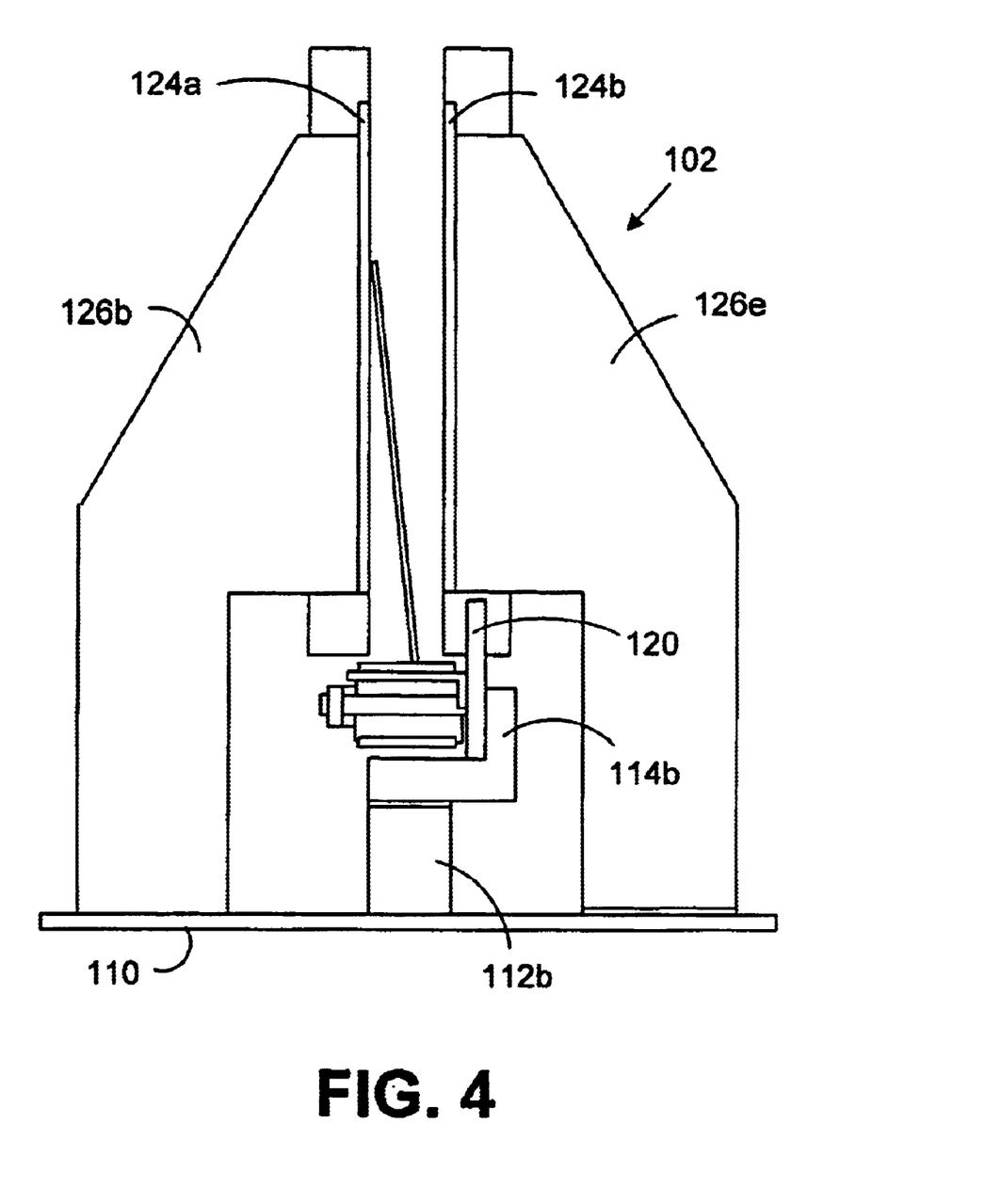
FIG. 4 is a cross sectional end view of the mail handling apparatus illustrated in FIG. 1.
Figure 5:
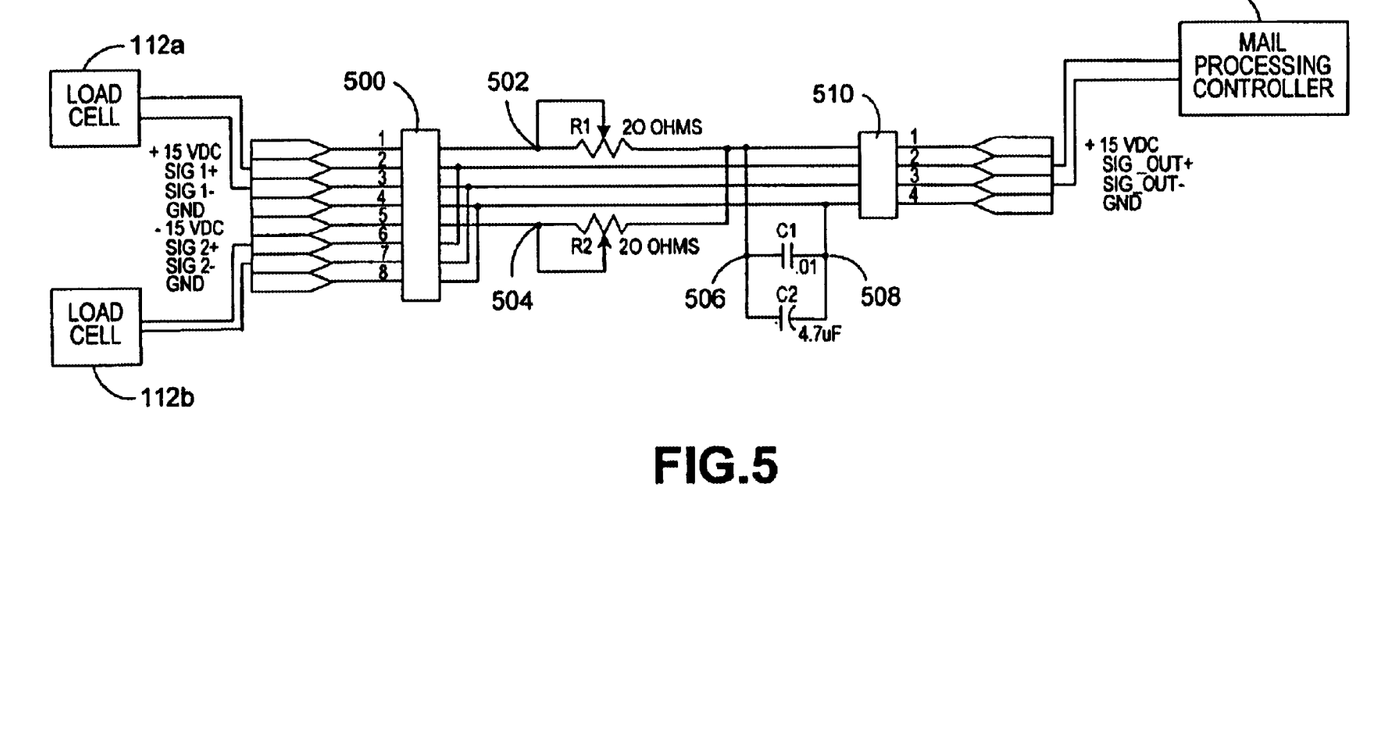
FIG. 5 is a circuit diagram of a trim balance circuit for use in a dual load cell embodiment of the mail handling apparatus of the present invention.

FIG. 5 is an illustration of the trim balance circuit 128. The trim balance circuit is an example of a circuit that can be used in the mailpiece processing system. Any type of circuit that can combine the two input signals from the dual load cells 112a and 112b into a single output signal is appropriate for the system. The first connector 500 has eight terminals which represent +15 voltage DC power supply, positive side of the first signal from load cell 112a, negative side of the first signal from load cell 112b, ground, −15 voltage DC power supply, positive side of the second signal from load cell 112b, negative side of the second signal from load cell 112b and ground. At nodes 502 and 504 are variable resistors R1 and R2 that can have a maximum resistance of about twenty ohms each. Between nodes 506 and 508 are two capacitors C1, C2 in parallel. The second connector 510 has four terminals which represent +15 voltage DC power supply, positive side of output signal that proceeds to the mail processing controller 100, negative side of output signal that also proceeds to the mail processing controller 100, and ground.

Referring again to FIGS. 1 through 4, support baffles 124a and 124b, which prevent mailpiece 104 from toppling over as it is conveyed through mailpiece weighing transport 102, are mounted on support baffle brackets 126a, 126b, 126c, 126d, 126e, and 126f which are mounted to base 110. Connecting the support baffles 124a and 124b in a vertical orientation to base 110 via on support baffle brackets 126a, 126b, 126c, and 126d, 126e, 126f reduces transient vibration at load cells 112a and 112b by isolating vibrations caused by mailpiece 104 impacting support baffles 124a and 124b. This arrangement also reduces the weight being carried by the load cells, in particular this configuration reduces the tare weight, thereby resulting in a more sensitive measurement of the load generated by mailpiece 104.

Horizontal Mailpiece Weighing Transport with a Single Load Cell

Figure 6:
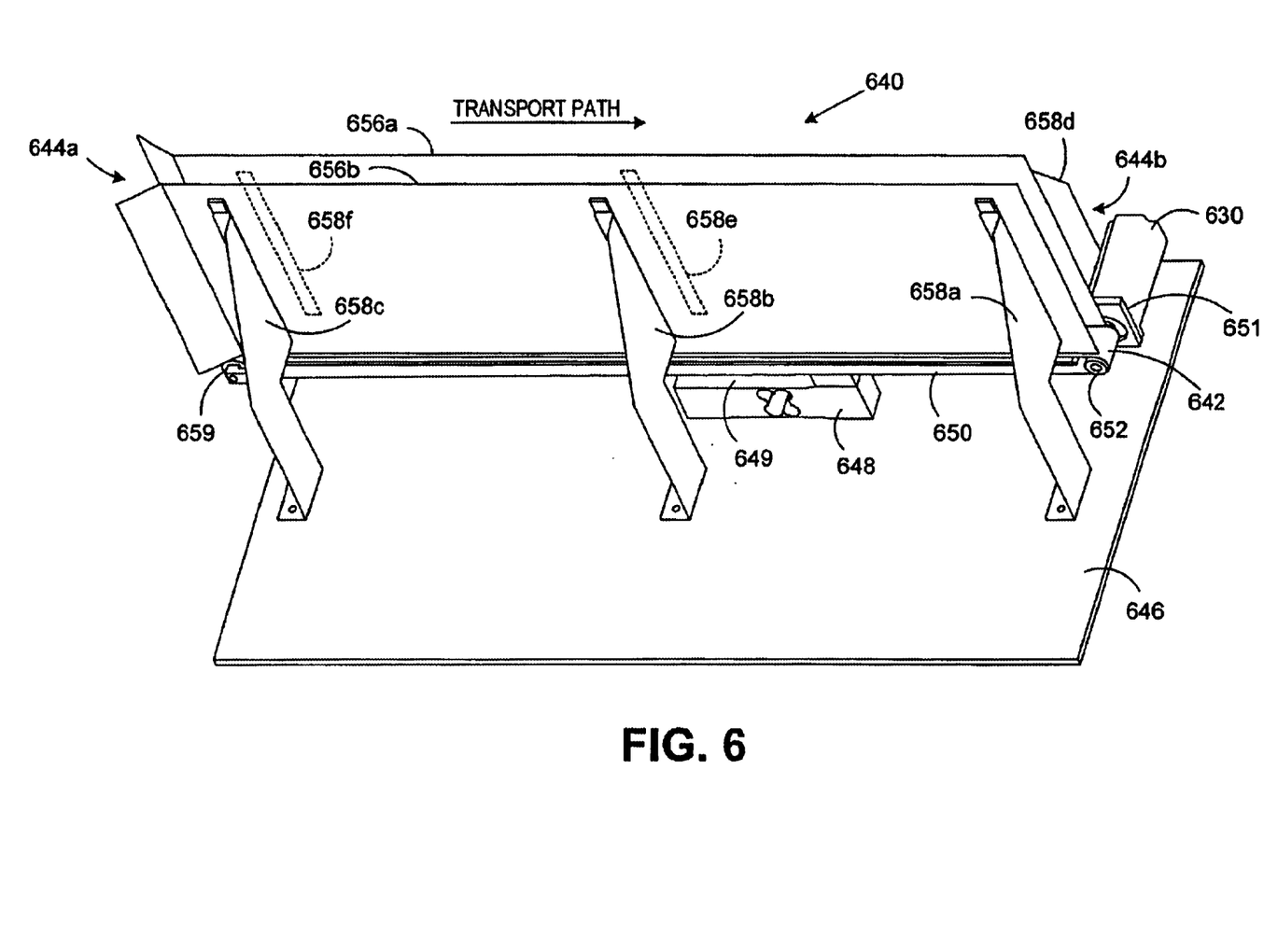
FIG. 6 is an isometric view of a single load cell embodiment of the mail handling apparatus of the present invention with a horizontal mail weighing transport.
Figure 7:
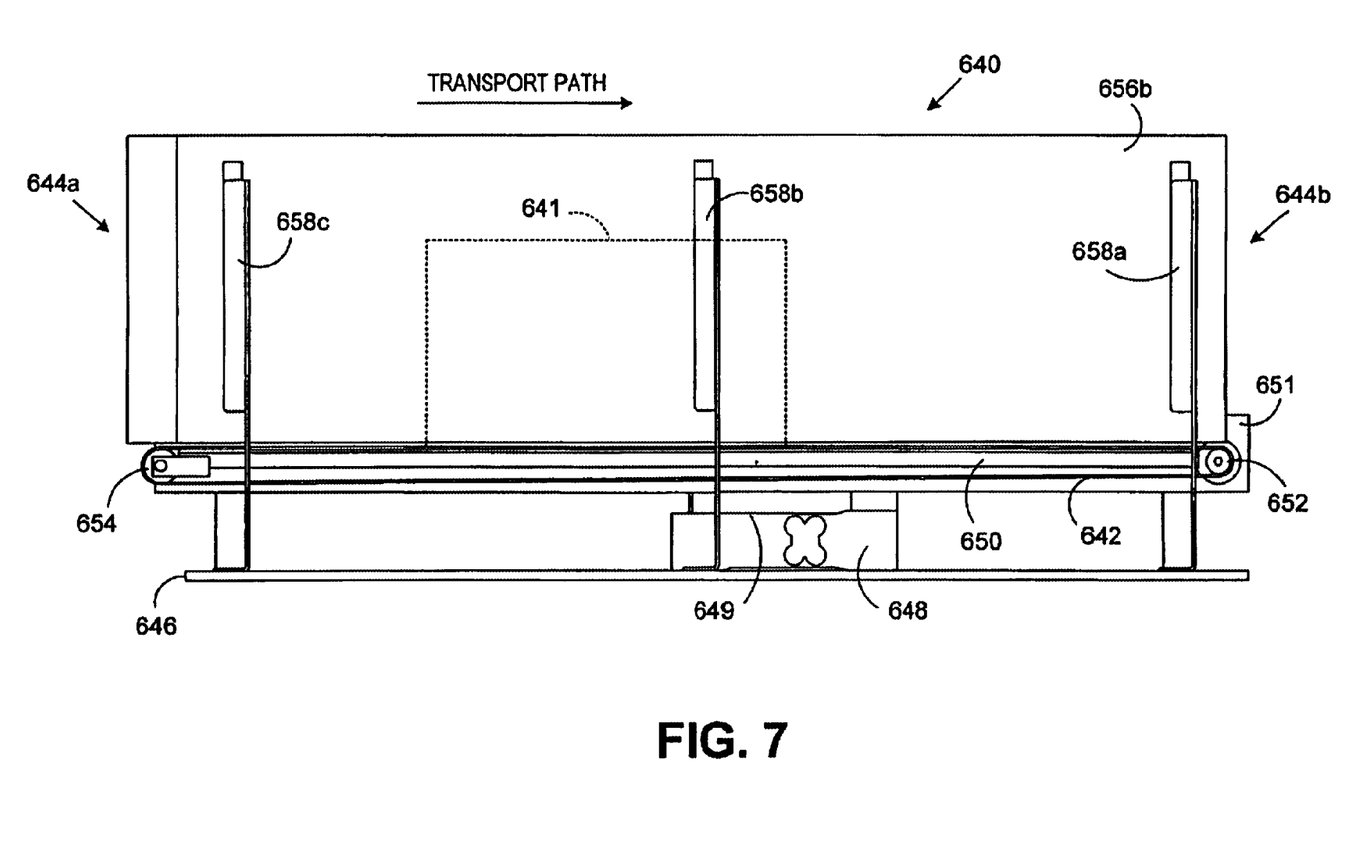
FIG. 7 is a side view of the mail handling apparatus illustrated in FIG. 6.

Referring to FIGS. 6 and 7, a single load cell mailpiece weighing transport 640 is shown. Mailpiece weighing transport 640, as will be discussed in more detail below, weighs and moves an individual mailpiece 641 along transport belt 642 from the input end of mailpiece weighing transport 640, generally designated by arrow 644a to the output end of mailpiece weighing transport 640. The course that the mailpiece 641 travels from the input end 644a to 644b is the transport path.

Mailpiece weighing transport 640 includes a base 646 upon which all of the components of mailpiece weighing transport 640 are mounted. In one preferred embodiment, a single load cell 648 having a weighing surface 649 is used to measure the weight of a mailpiece 641 as it travels through mailpiece weighing transport 640. Load cell 648 is mounted on base 646 at the center of gravity of mailpiece weighing transport 640. Transport belt 642 is supported by drive pulley 652 and idler pulley 654 which, in turn, are connected to support plate 651. Transport belt 642 is also supported by slider plate 650 which is also connected to support plate 651. Locomotion to the system is provided by motor 630 which is mounted on mailpiece weighing transport 640 and directly connected to drive pulley 652. Support baffles 656a and 656b are mounted parallel to each other and in a vertical orientation on opposing sides of transport belt 642. Support baffle 656a is held in place by support baffle brackets 658a, 658b and 658c which are mounted on slider plate 650. Support baffle 656b is held in place by support baffle brackets 658d, 658e and 658f which are mounted to the support plate 651.

In general, the single load cell embodiment of the invention functions the same as the dual load cell embodiment. The single load cell embodiment illustrated herein has the vertical support baffles integrated into the weighing platform as opposed to being attached to the base as illustrated in the dual load cell configuration. It will be understood by one skilled in the art that single and multiple load cell configurations may be provided with either base attached support baffles or weighing platform attached support baffles. It will also be understood that the single load cell embodiment does not require the use of a trim balance circuit to combine the load measurement prior to weight calculation. Just as with the dual load cell embodiment, the measurement of the load minus the tare is filtered to account for any transient vibrations and the resulting measurement is then converted to a weight measurement and transmitted to mail processing system controller 100 (such as the WOW board utilized in Pitney Bowes Paragon® and Galaxy® automated mail processing systems).

In operation, a mailpiece enters the mailpiece weighing transport 640 in a vertical orientation at input end 644a and moves along on transport belt 642 towards output end 644b. The mailpiece is biased against transport belt 642 by gravity and is maintained in a vertical orientation by support baffles 656a and 656b which prevent the mailpiece from toppling over as it is conveyed thorough mailpiece weighing transport 640. The weighing platform of mailpiece weighing transport 640 consists of transport belt 642 (an endless flat belt) supported between drive pulley 652 and idler pulley 654 with slider plate 650 which are together mounted to support plate 651, wherein forward motion is provided to transport belt 642 by motor which is mounted also on support plate 651 and directly connected to drive pulley 652, and support baffles 656a and 656b are also part of the weighing platform.

Vertical Mailpiece Weighing Transport

The embodiments in FIGS. 1 through 7 feature a mail processing system with a mail weighing transport 102, 640 that is horizontal (parallel) to the base 110, 646. In an alternative embodiment, the mail weighing transport can be constructed such that it is vertical (perpendicular) to the base.

Figure 8:
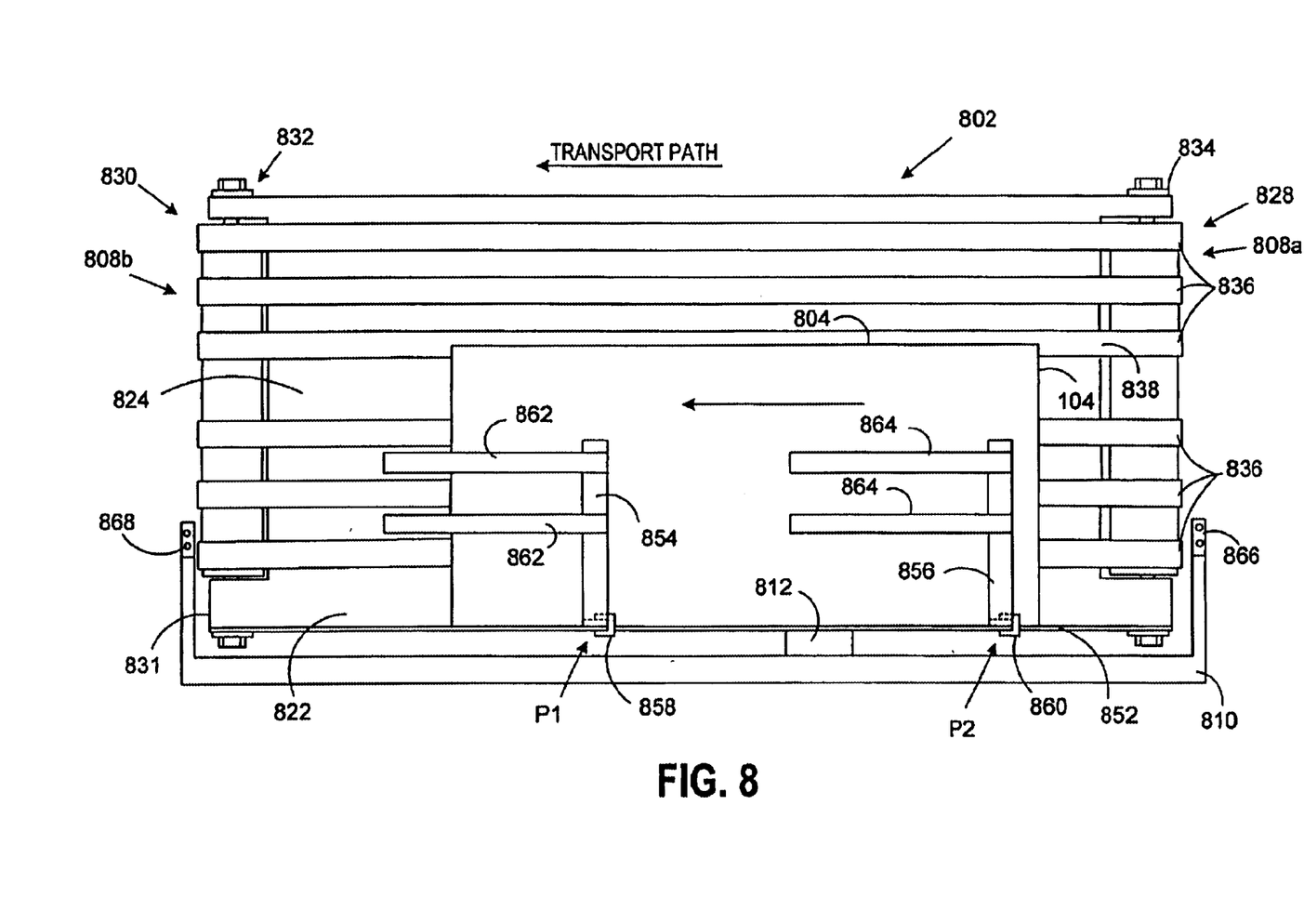
FIG. 8 is a front view of a single load cell embodiment of the mail handling apparatus of the present invention with a vertical mail weighing transport.
Figure 9:
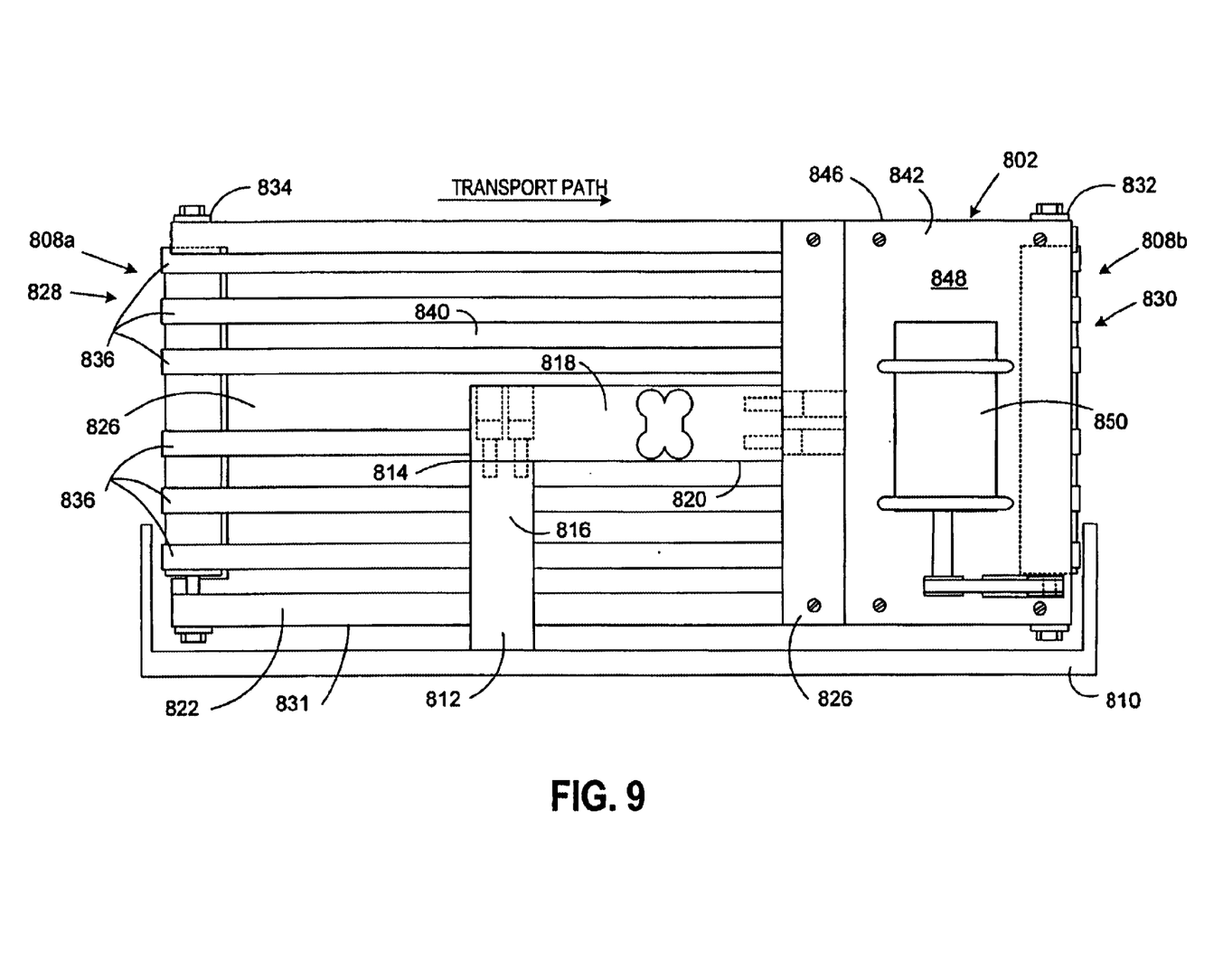
FIG. 9 is a rear view of a single load cell embodiment of the mail handling apparatus illustrated in FIG. 8.

Referring to FIGS. 8 and 9, a vertical mailpiece weighing transport 802 is shown. Mailpiece weighing transport 802 weighs and transports an individual mailpiece 804 along the transport path from the input end of the mailpiece weighing transport 802, generally designated by arrow 808a to the output end of the mailpiece weighing transport 802, generally designated by arrow 808b.

Mailpiece weighing transport 802 includes base 810 upon which all of the components of mailpiece weighing transport 802 are mounted. Structural pillar 812 has a top surface 814 and a back surface 816. Structural pillar 812 is connected to base 810 and is responsible for suspending all of the components of the mailpiece weighing transport 802. Single load cell 818 has a weighing surface 820 and is located on the top surface 814 of the structural pillar 812.

Support plate 822 is a structure that holds all of the components of the mailpiece weighing transport 802 with the exception of base 810, structural pillar 812, and single load cell 818. Support plate 822 has a front side 824, back side 826, input side 828, output side 830, and bottom edge 831. The center of back side 826 of support plate 822 is connected to the center of the weighing surface 820 of single load cell 818. Since single load cell 818 is connected to the center of the back side 826 of the support plate 822, single load cell 818 is located at the center of gravity of the support plate 822 and the mailpiece weighing transport 802. A drive pulley 832 and an idler pulley 834 are connected to the output side 830 and input side 828 of support plate 822, respectively. A plurality of transport belts 836 having a front side 838 and back side 826 are connected to support plate 822 by drive pulley 832 and idler pulley 834 (both pulleys are depicted by phantom lines in FIG. 9). Both the front side 838 and back side 840 of the plurality of transport belts 836 reside in planes that are perpendicular to base 810. Suspended pillar 842 having a front side 846 and back side 848, is mounted to back side 840 of support plate 822. A motor 850 is electrically connected to the drive pulley 832 and physically connected to the back side 848 of suspended pillar 842. Transport guide 852, having mounting points P1 and P2, is mounted to bottom edge 831 of support plate 822. Transport guide 852 is parallel to base 810 and runs the entire length of bottom edge 831 of support plate 822. Holding brackets 854, 856 are mounted to mounting points P1 and P2 by C-clamps 858, 860. Alternatively, the C-clamps 858, 860 can be eliminated, and the holding brackets 854, 856 can be directly mounted to transport guide 852. Mounted to holding brackets 854, 856 are flat springs 862, 864. A first sensor 866 is connected to the base on the input side. A second sensor 868 is connected to the base on the output side. Any type of sensor that can detect the movement of a mailpiece in the mail weighing system can be used. For example, optical sensors are able to perform this function.

A mailpiece 804 in a vertical orientation enters the vertical mail weighing transport 802 at the input end 808b. Mailpiece 804 is initially biased against front side 838 of transport belts 836. As the mailpiece 804 moves along the mail weighing system 802, the bottom edge of the mailpiece is in contact with transport guide 852. The mailpiece 804 is kept in contact with front side 838 of transport belts 836 by the normal force created by flat springs 858, 860. In this vertical mail weighing system 802, the weighing platform comprises all of the components attached to single load cell 818, that is support plate 822, pulleys 832, 834, transport belts 836, holding brackets 854, 856, C-clamps 858, 860, flat springs 862, 864, transport guide 852, suspended pillar 842, and motor 850. The entire weighing platform constitutes the tare. The weight of mailpiece 804 is determined by measuring the load generated (the signal output by single load cell 818) when the mailpiece 804 pushes against the weighing surface 820 of the single load cell 818 minus the tare. As with the previous embodiments, the remaining load is assumed to be generated by mailpiece 804, and the signal produced by single load cell 818 is converted to a weight measurement and transmitted to mail processing system controller 100.

The advantage of the vertical configuration of the mail weighing transport 802 is that it minimizes the introduction of vibrations or oscillations as noise into the weighing system. For example, pulleys 832, 834 and transport belts 836 have the potential to produce vibration which would impact the weighing process. By having the weighing surface of the load cell oriented vertically, any vibrations caused by pulleys 832, 834 and transport belts 836 are further minimized since some of the vibrations are divided between vertical and horizontal vectors. In contrast, the entire vibration would be experienced by the load cells in a horizontal mail processing system.

In any of the aforementioned embodiments of the present invention, a stop on demand feature can be added to the mail processing system. Whenever any parameter is measured, there is an inherent error associated with the measurement, the margin of error. Errors can arise from the transitory oscillations or vibrations of the mailpiece weighing transport. In the case of the present invention, an error is always associated with the measured weight of the mailpiece. If a weight break falls within a measurement plus or minus the margin of error, then the mailpiece should be reweighed to verify the measurement. For example, the U.S. Postal Service determines the proper postage for a mailpiece based on weight in one ounce increments, or weight breaks. A first class letter weighing one ounce or less requires thirty-four cents postage. If a letter weighs more than one ounce (approximately twenty-eight grams), then the postage increases to fifty-five cents. Thus it is critical for the weights to be accurately measured when the measured weights fall within the margin of error of the system. This problem solved in three ways. The first is to apply more postage than necessary. This method is not optimal because it results in added unnecessary expense. The second way is to divert the mailpiece down a separate path and have the mailpiece reweighed by hand or a more sensitive system. The third way is to stop the transport and allow the load cell to stabilize. After stabilization, the mailpiece can be reweighed. To capture this criticality, a stop on demand algorithm can be implemented in the mail processing system controller 100.

Figure 10:
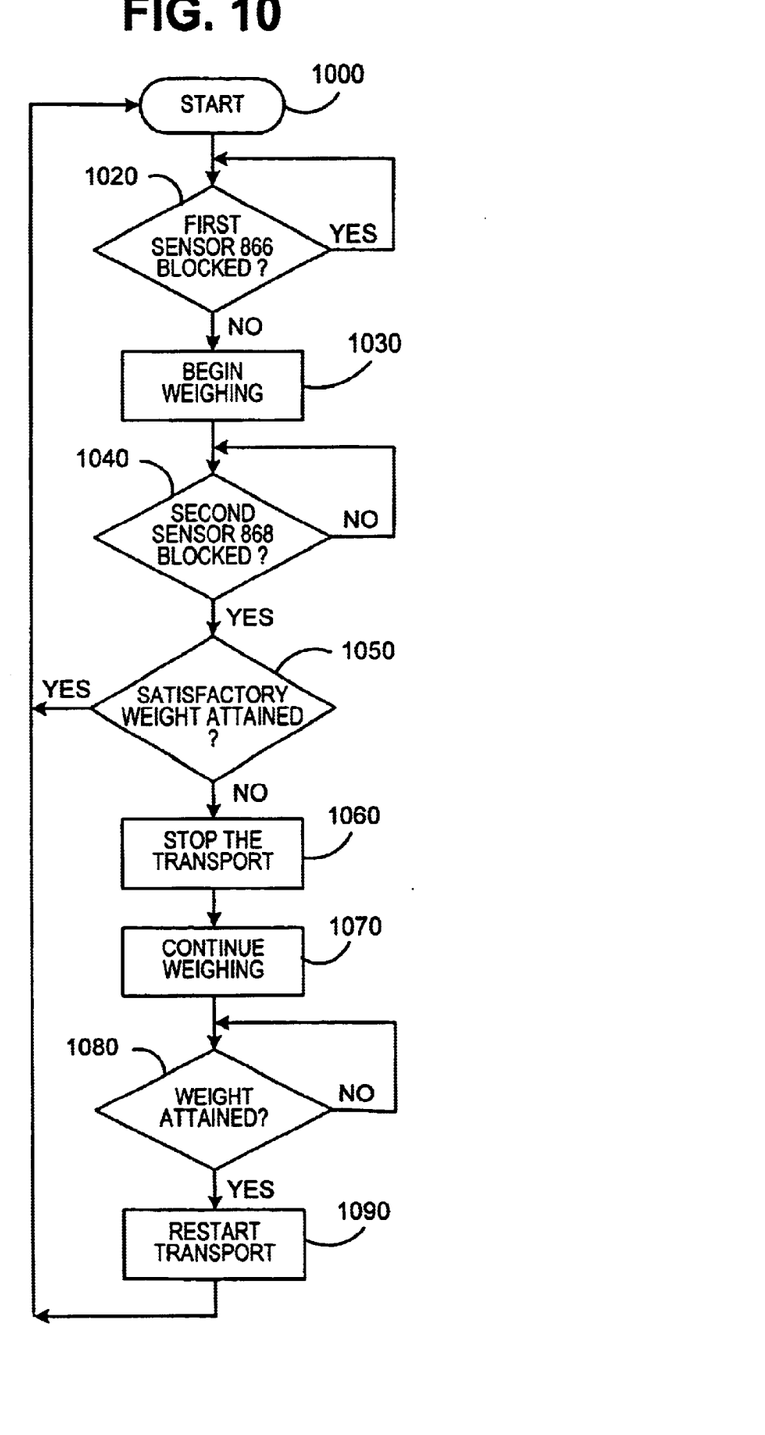
FIG. 10 is a flow diagram of the stop on demand weighing process.

Referring to FIG. 10, at step 1000, the mailpiece weighing transport is initiated. At step 1020, a decision is made as to whether the first sensor 866 is blocked by mailpiece 804. If the first sensor 866 is blocked, then mailpiece 804 may need to be removed from the mailpiece weighing transport. If not, mailpiece 804 proceeds to the load cell and the weighing begins, step 1030. After weighing, the mailpiece 804 progresses along the transport path. At step 1040, a decision is made as to whether the second sensor 868 is blocked by mailpiece 804. If so, the mailpiece may not be removed. If not, the stop-on-demand system progresses to step 1050. At this step, a decision is made as to whether the weight obtained was satisfactory. An unsatisfactory weight, for example, would be one that has a postal weight break within the margin of error of the weight obtained. If an unsatisfactory weight is obtained, the transport is stopped in step 1060. Then, the weighing is continued at step 1070. Continued weighing can include the reweighing of mailpiece 804. Step 1080 allows for a loop that keeps reweighing mailpiece 804 until a satisfactory weight is obtained. Only when a satisfactory weight is obtained does mailpiece 804 proceed to step 1090 in which the mailpiece weighing transport 802 is restarted.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims. For example while the preferred embodiment is described in connection with a mail handling machine, any apparatus for handling articles can utilize the principles of the invention. Additionally, while a mailpiece weighing transport utilizing belts is described it is known to use rollers and other transport mechanisms.

What is claimed is:

1. A method for weighing mailpieces while in motion in a mailpiece weighing system having a system controller comprising:

receiving mailpiece in the transport system;

moving said mailpiece along a horizontal transport path coupled to a weighing mechanism;

supporting said moving mailpiece in said horizontal transport path with a guide;

generating a signal corresponding to a weight of said moving mailpiece when said moving mailpiece reaches said weighing mechanism on said horizontal transport path;

comparing said weight of said moving mailpiece to a postal weight break to determine if said postal weight break is within the margin of error of said weighing mechanism;

stopping transport of said moving mailpiece if said postal weight break is within the margin of error of said weighing mechanism;

reweighing said mailpiece if said postal weight break is within the margin of error of said weighing mechanism; and transmitting said signal to said system controller.

2. A method according to claim 1 wherein said weighing mechanism is a single load cell.

3. A method according to claim 1 wherein said weighing mechanism comprises a first load cell and a second load cell.

4. A method according to claim 1 wherein said guide is a plurality of support baffles.

\* \* \* \* \*